US011682151B2

(12) United States Patent
Charraud et al.

(10) Patent No.: US 11,682,151 B2
(45) Date of Patent: Jun. 20, 2023

(54) SYSTEM AND METHOD FOR A PERSONALIZED AND ACCURATE VIRTUAL MAKE-UP TRY-ON

(71) Applicant: L'OREAL, Paris (FR)

(72) Inventors: Grégoire Charraud, Levallois-Perret (FR); Helga Malaprade, Vincennes (FR)

(73) Assignee: L'OREAL, Paris (FR)

( * ) Notice: Subject to any disclaimer, the term of this patent is extended or adjusted under 35 U.S.C. 154(b) by 0 days.

(21) Appl. No.: 17/355,661

(22) Filed: Jun. 23, 2021

(65) Prior Publication Data
US 2021/0407162 A1 Dec. 30, 2021

Related U.S. Application Data

(60) Provisional application No. 63/046,168, filed on Jun. 30, 2020.

(30) Foreign Application Priority Data

Oct. 14, 2020 (FR) ........................... 2010516

(51) Int. Cl.
G06T 11/60 (2006.01)
G06T 7/90 (2017.01)
G06V 40/16 (2022.01)
G06N 3/04 (2006.01)
G06Q 30/06 (2012.01)
G06T 11/00 (2006.01)
G06Q 30/0601 (2023.01)

(52) U.S. Cl.
CPC ............... *G06T 11/60* (2013.01); *G06N 3/04* (2013.01); *G06Q 30/0643* (2013.01); *G06T 7/90* (2017.01); *G06T 11/001* (2013.01); *G06V 40/165* (2022.01)

(58) Field of Classification Search
None
See application file for complete search history.

(56) References Cited

U.S. PATENT DOCUMENTS 9,445,087 B2 * 9/2016 Hillebrand ................ G01J 3/52
9,449,412 B1 * 9/2016 Rogers ............... G06Q 30/0623
2019/0014884 A1 * 1/2019 Fu ........................... G06T 19/20
(Continued)

FOREIGN PATENT DOCUMENTS

CN 110414397 A 11/2019

OTHER PUBLICATIONS

International Search Report and Written Opinion dated Oct. 29, 2021 in PCT/IB2021/000436, 10 pages.
(Continued)

*Primary Examiner* — Edward Martello
(74) *Attorney, Agent, or Firm* — Oblon, McClelland, Maier & Neustadt, L.L.P.

(57) ABSTRACT

An aspect is a system and method that includes determining virtual try-on display adjustment information responsive to receiving one or more digital images taken upon application of a calibration cosmetics product, generating virtual try-on display parameters for modifying a digital try-on experience based at least in part on the virtual try-on display adjustment information, and generating one or more instances of a modified virtual try-on experience on a user interface based on the virtual try-on display parameters.

20 Claims, 7 Drawing Sheets

(56) References Cited

U.S. PATENT DOCUMENTS

| | | |
|---|---|---|
| 2019/0122404 A1* | 4/2019 | Freeman .............. G06V 40/171 |
| 2019/0269224 A1 | 9/2019 | Fu et al. |
| 2019/0289986 A1 | 9/2019 | Fu et al. |
| 2020/0015575 A1 | 1/2020 | Fu et al. |

OTHER PUBLICATIONS

French Preliminary Search Report and Written Opinion dated Jun. 22, 2021 in French Patent Application No. 2010516 (with English translation of Category of cited Documents), 7 pages.

* cited by examiner

SYSTEM AND METHOD FOR A PERSONALIZED AND ACCURATE VIRTUAL MAKE-UP TRY-ON

CROSS-REFERENCE TO RELATED APPLICATIONS

This application claims the benefit of priority to provisional application No. 63/046,168 filed Jun. 30, 2020 and French application Serial No. 2010516 filed Oct. 14, 2020, the entire contents of which are incorporated herein by reference.

TECHNICAL FIELD

The present disclosure is directed to make-up calibration and a method for personalized and accurate virtual try-on of make-up.

DESCRIPTION OF THE RELATED ART

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Smartphones and tablets with front facing cameras offer a capability of taking pictures and videos of the person having the camera at hand in a manner that the person can view the image that is to be captured. Various mobile applications, often referred to as an App, have been developed that make use of front facing cameras. A common App is one that allows taking a self portrait photo that is referred to as a "selfie," and inserting the selfie into some social media context or forwarding the selfie to be shared with others by e-mail or text.

Some cosmetic product companies have begun to develop Apps that provide assistance in selecting cosmetic products. Some Apps may provide tools for searching for particular types of make-up, or searching for a product that may be a favorite or a previously used product. Some Apps may offer tutorials on how to apply certain types of make-up. Some Apps may provide assistance in choosing colors by displaying color palettes for eyeshadow or lipstick colors. Some Apps may provide color matching features to assist in searching for a color that matches clothing, and accessory, or a color from a picture.

Some cosmetic product companies have begun to offer product try-on applications which make use of the front facing camera on a smartphone. Some of these applications are implemented as Web applications, with an optional App that may be installed on a smartphone or Tablet. Some of these applications work by taking a self portrait photo with the smartphone camera, uploading the photo to the Web application, then applying virtual make-up products to the uploaded image.

The try-on web applications or Apps that use virtual make-up have limitations. The try-on web applications and Apps attempt to overlay color of the virtual make up with the color in the photo. The overlaying of colors does not accurately render color, texture and shapes on a person's specific face area like lip or eyelid. The virtual try-on process overlays, replaces, pixels directly with the cosmetic products' color directly without taking into account the transparency of the real cosmetic product and the real cross effect of the cosmetic product with the person's raw skin color and texture. Moreover, the same overlaying process is applied for all consumers in the same way without taking into account skin color deviation for a same product.

These limitations thus create several problem areas. Cosmetic virtual try on is not truly personalized without taking into account a person's skin color and texture. The virtual rendering is off most of the time compared to what the real cosmetic product application would look like.

An alternative of distributing special personalization machines of formula is time consuming and costly because a sampling system needs to be added to the machine so as to deliver small dose of product for the consumer to test and then modify the product recipe depending of the bias measured on a consumer's skin.

Further, e-commerce personalization try-on services are not scalable to end consumers with their smartphone because color deviation for each consumer is too high.

It is one object of the present disclosure to describe a system and method that provides a method of allowing a user to accurately virtually try-on make-up.

SUMMARY

An aspect is a method, including determining, by processing circuitry, virtual try-on display adjustment information responsive to receiving one or more digital images taken upon application of a calibration cosmetics product; generating, by the processing circuitry, virtual try-on display parameters for modifying a digital try-on experience based at least in part on the virtual try-on display adjustment information; and generating, by the processing circuitry, one or more instances of a modified virtual try-on experience on a user interface based on the virtual try-on display parameters.

An aspect is a display system, including processing circuitry configured to determine virtual try-on display adjustment information responsive to receiving one or more digital images taken upon application of a calibration cosmetics product; generate virtual try-on display parameters for modifying a digital try-on experience based at least in part on the virtual try-on display adjustment information; and generate one or more instances of a modified virtual try-on experience on a user interface based on the virtual try-on display parameters.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
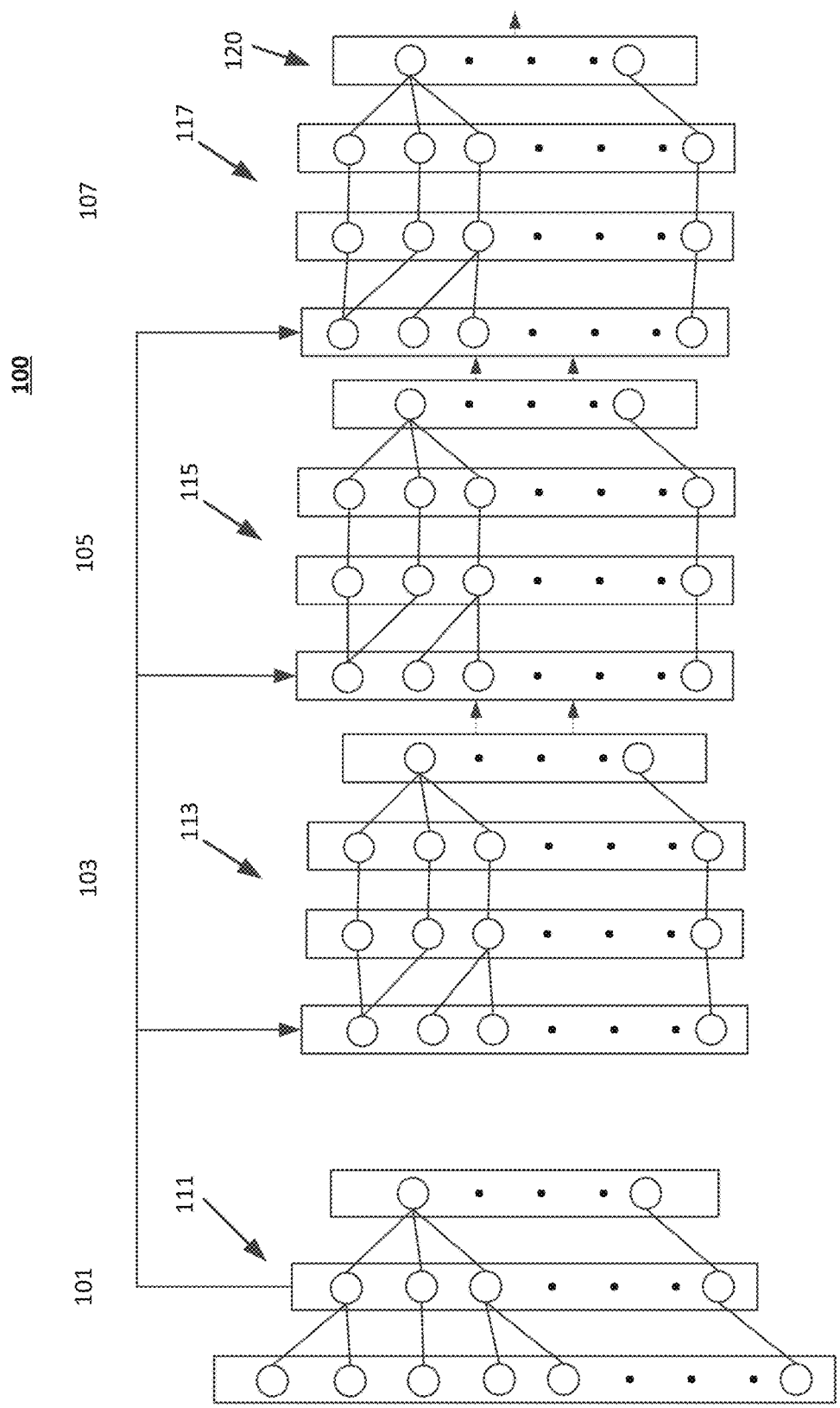
FIG. 1 is a diagram of an artificial neural network architecture in accordance with an exemplary aspect of the disclosure.

In the drawings, like reference numerals designate identical or corresponding parts throughout the several views. Further, as used herein, the words "a," "an" and the like generally carry a meaning of "one or more," unless stated otherwise. The drawings are generally drawn to scale unless specified otherwise or illustrating schematic structures or flowcharts.

Furthermore, the terms "approximately," "approximate," "about," and similar terms generally refer to ranges that include the identified value within a margin of 20%, 10%, or preferably 5%, and any values therebetween.

Aspects of this disclosure are directed to a personalized and accurate cosmetic product virtual try-on system and method. The virtual try-on system includes a make-up calibration kit that fully characterizes cosmetic product color, deviation, transparency, light effect, and contains a precise applicator that ensures application of a controlled thickness of the make-up calibration product. The virtual try-on generates an augmented reality display of a person's face using a video, selfie, or a model picture and a virtual make-up selection. The augmented reality display is realized by way of an artificial neural network that makes adjustments of color for automatic shade correction.

In order to provide an accurate rendering of a person's face augmented with a make-up, the inventors have determined that a person's skin color and texture needs to be taken into account. The inventors have determined that features of the make-up including color, dispersion, reflection, transparency and light effect also need to be taken into account. An artificial neural network model has developed for various deviations in color, transparency, reflection and lighting conditions.

FIG. 1 is a diagram of an artificial neural network architecture in accordance with an exemplary aspect of the disclosure. The artificial neural network may be any supervised learning-type neural network that is capable of outputting a color value for various lighting conditions based on input of a feature vector. In an exemplary embodiment, the artificial neural network may be a multi-layered neural network having at least one hidden layer and may be trained by a supervised learning algorithm such as the back-propagation learning algorithm. Each node in the artificial neural network may be a McCulloch-Pitts neuron having a transfer function. The training of the artificial neural network may be performed in a cloud service, where the training may be performed off-line using data from hundreds of consumers. In an exemplary embodiment, a deep learning artificial neural network is performed in a public cloud service.

In one or more embodiments, the deep learning artificial neural network may be a Convolution Neural Network. The Convolution Neural Network include hidden layers that perform convolution operations. The convolution operation generates a feature map. Other layers may follow the hidden layers, including pooling layers, fully connected layers and normalization layers.

The architecture of the artificial neural network 100 shown in FIG. 1 includes a sequence of N sub-networks 101, 103, 105, 107. Sub-networks 103, 105, 107 may each be a multilayer artificial neural network, each having at least two hidden layers 113, 115, 117. An output layer 120 provides and output that depends on how the artificial neural network is trained.

The artificial neural network 100 may be trained with digital images as an input. As an alternative, the artificial neural network 100 may be trained with feature vectors which may include the following:
color value
deviation on skin tone
discrepancy in transparency
discrepancy in dispersion
discrepancy in light reflection value The output value of the output layer 120 may be a modified color value and a lighting condition.

For example, the artificial neural network 100 may be trained to provide, as an output value, a category and an associated corrected color value (e.g., a hue value, tint value, tone value, shade value, and other values that represent a color) and lighting condition. Categories of color include hue, tint, tone, and shade. A tint is a lighter version of a color and shade is a darker version of that color. Tone typically refers to the lightness (tint) or shade (darkness) of a color.

In one embodiment, an artificial neural network 100 is trained with a dataset of several hundred digital images with one or more of a known hue, tint, tone, shade, or the like and a known lighting condition (e.g., a known lighting direction, a known lighting source, a known lighting intensity, or the like.)

In the one embodiment, the trained artificial neural network is an encoder-decoder structured neural network having at least two sub-networks. In the one embodiment, a first sub-network 101 takes as input a digital image with undefined or unknown lighting condition and performs encoding to create a feature map representation of color information, lighting information, or the like. In the one embodiment, a second sub-network 103 takes as input the output from the encoder 101 and regenerates the digital image with a modified color, a modified lighting condition, or other color modification.

Figure 2:
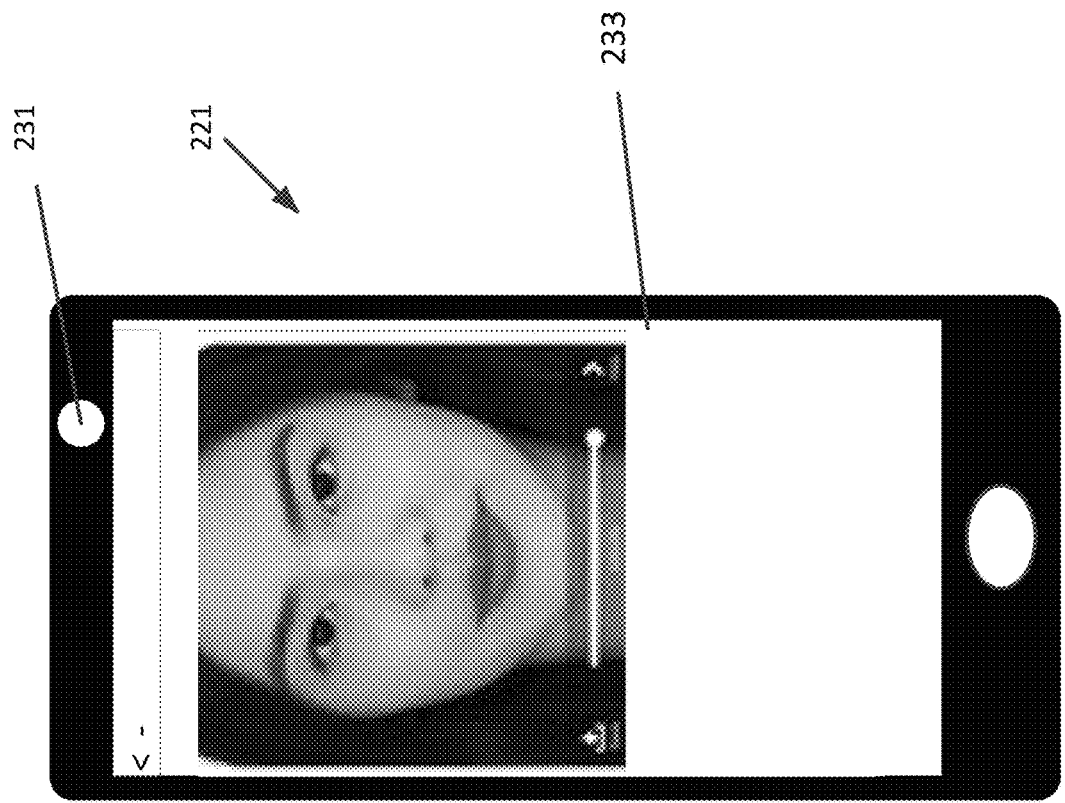
FIG. 2 is a schematic diagram of a make-up calibration system in accordance with an exemplary aspect of the disclosure.
Figure 2:
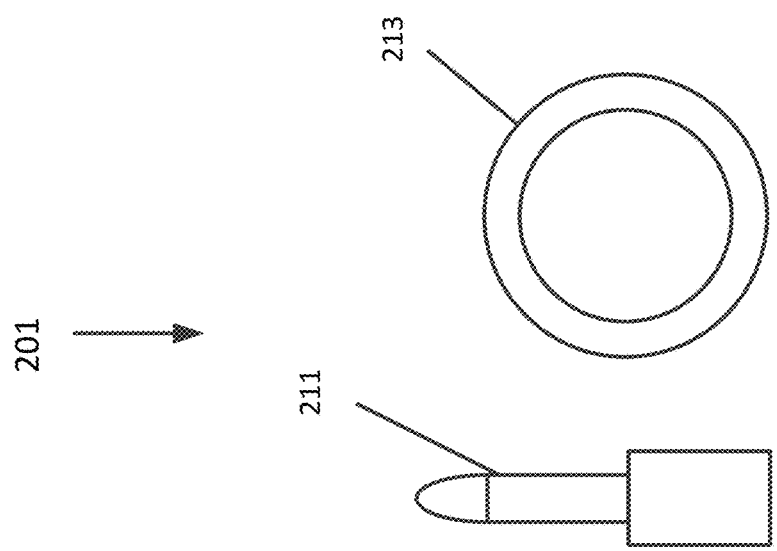

FIG. 2 is a schematic diagram of a make-up calibration system in accordance with an exemplary aspect of the disclosure. The virtual make-up try-on system makes use of results from a make-up calibration kit 201. The calibration kit 201 contains one or more physical cosmetic products and may be obtained from a retail store that sells cosmetic products, or an online store, or directly from a cosmetic product manufacturer. The calibration kit 201 may be accompanied by a mobile App 233. The mobile App 233 may be downloaded from an App store. The mobile App 233 may provide assistance in using the calibration kit 201, as well as provide function to be used in conjunction with the calibration kit 201. The mobile App 233 may be executed on a smartphone 221 or a tablet computer. The smartphone 221 or tablet computer preferably includes a front view camera 231. The App 233 may include a feature of using the camera function of the smartphone 221 or tablet computer to capture a still digital image of the face of the subject user or a video. Web version of the App may be accessed from any laptop or desktop computer having a Web browser. The Web version of the App requires at least one photo of the subject user, which may be uploaded to the Web server. In some embodiments, the Web version of the App is performed in a cloud service. The Web version of the App 233 does not require a smartphone or tablet and the digital image of the face of the subject user may be obtained using a digital camera. Alternatively, the digital image of the subject user may be obtained by scanning a printed photo of the subject user.

The physical products contained in the make-up calibration kit 201 may include a calibration lipstick 221, a calibration eyeshadow 213, and applicators for the lipstick and eyeshadow. The calibration lipstick 211 may be a fully characterized lipstick regarding color, deviation on different skin tones, transparency, and light effect. In one embodiment, the calibration lipstick 211 may be a semitransparent green lipstick. The calibration eyeshadow 213 may be a fully characterized eyeshadow regarding color, deviation on different skin tones, transparency, light effect. In one embodiment, the calibration eyeshadow 213 may be an opaque green powder. The calibration applicator for the lipstick and eye shadow is preferably a precise applicator for lip and eye shadow ensuring application of precise contours in a controlled thickness of product on the skin.

Figure 3A:
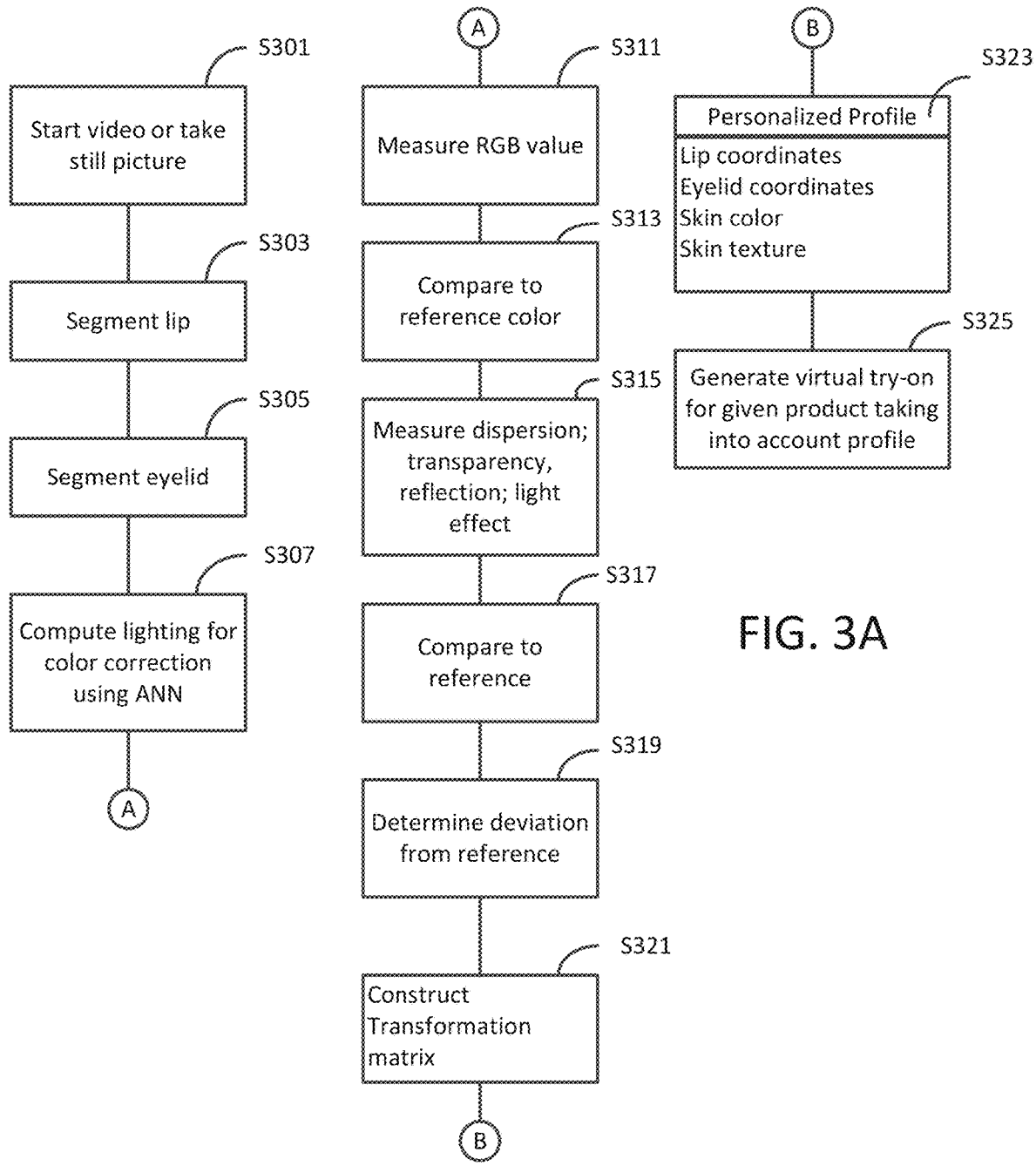
FIGS. 3A and 3B are a flowchart of a make-up calibration personalized virtual make-up try-on method using the result of the calibration in accordance with an exemplary aspect of the disclosure.
Figure 3B:
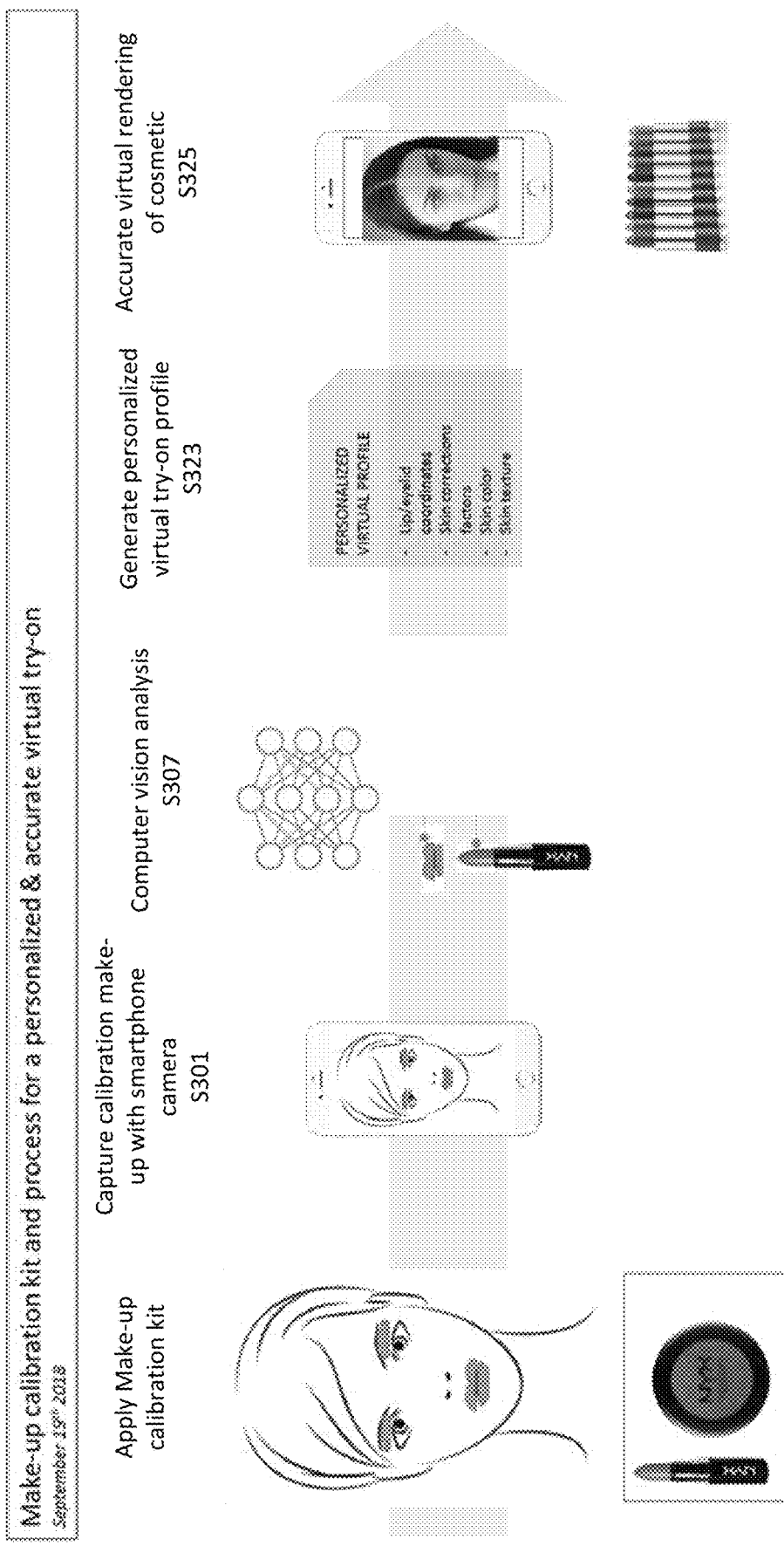

FIGS. 3A and 3B are a flowchart of a method of calibrating make-up and personalized virtual make-up try-on in accordance with an exemplary aspect of the disclosure. In S301, the smartphone App 233 begins taking a video of the subject person or snaps a still picture. As mentioned above, the video or still picture may also be obtained using a digital camera. The video or still picture should include the entire body area where the make-up is applied on the skin. For example, the body area may include the entire face, so that the subject user will be able to determine the appearance of the make-up.

Computer vision software is executed to interpret the still digital image or video images. The computer vision software may be executed on the smartphone or tablet computer 221. In some embodiments, computer vision algorithms are performed in a desktop computer, or the cloud service. The smartphone or tablet computer 221 may execute the computer vision software in real time as video captured from the front facing camera is being captured and displayed. In S303 and S305, areas of interest including lips, eyelid, cheeks are segmented using a contrast analysis of the color difference between the individual's skin and the calibration make-up color. In some embodiments, the video or still digital image of a subject user's face having the calibration make-up may be displayed on a display screen of the smartphone or tablet computer 221.

In S309, the artificial neural network 100 may assess ambient lighting for color correction. As noted above, the artificial neural network 100 is pre-trained to provide a modified digital image for different lighting conditions. In some embodiments, the modified digital image includes RGB values of each pixel. The artificial neural network 100 can perform color correction for each pixel of a video image or of a still digital image. In some embodiments, several hundred artificial neural networks 100 operate in parallel to correct each pixel of the pixels in a video image or still digital image in parallel.

Further computer vision analysis of the video images or still digital image of steps S303 and S305 are performed. The further computer vision analysis may be performed by the smartphone or tablet computer 221, or may be performed in desktop computer or a cloud service. In S311, the further computer vision analysis includes measuring the color of each pixel in the video images or still digital image of the subject user's face having the calibration make-up applied on the skin.

The calibration lipstick and calibration eyeshadow have their color, light reflection values, and transparency values stored in a reference matrix. In S313, the color values of each pixel in the video images or the still digital image are compared to color reference values in the reference matrix. In a similar manner, in S315, light reflection values, dispersion, transparency, and a light effect may be measured for the video images or still digital image. In S317, computer vision analysis is performed based on the color and texture reference values for the calibration lipstick and calibration eyeshadow. In S319, the computer vision analysis includes assessing the deviation on texture and color compared to texture and color values in the reference matrix to determine transformation coefficients for color and texture for the calibration lipstick and calibration eyeshadow as applied to a subject user.

In S321, the results of the computer vision analysis including deviation in texture and color are used to compute a transformation color matrix for skin color and skin texture for the subject user. The transformation color matrix includes numerical coefficient values for transforming a skin color and numerical values for transforming a skin texture for virtual cosmetic products of various colors and texture. The transformation color matrix will be used to render the personalized make-up on the subject user's skin. In S323, the transformation color matrix is saved in a file that represents a personal correction profile.

The above calibration process can be performed for several consumers to generate a personalized correction file for each consumer.

Next, in S325, the virtual make-up try-on process can take into account the virtual/digital cosmetic product color and texture and modify the effect on the original digital image of the subject user by applying the transformation matrix deduced from the personalized correction profile.

Figure 4:
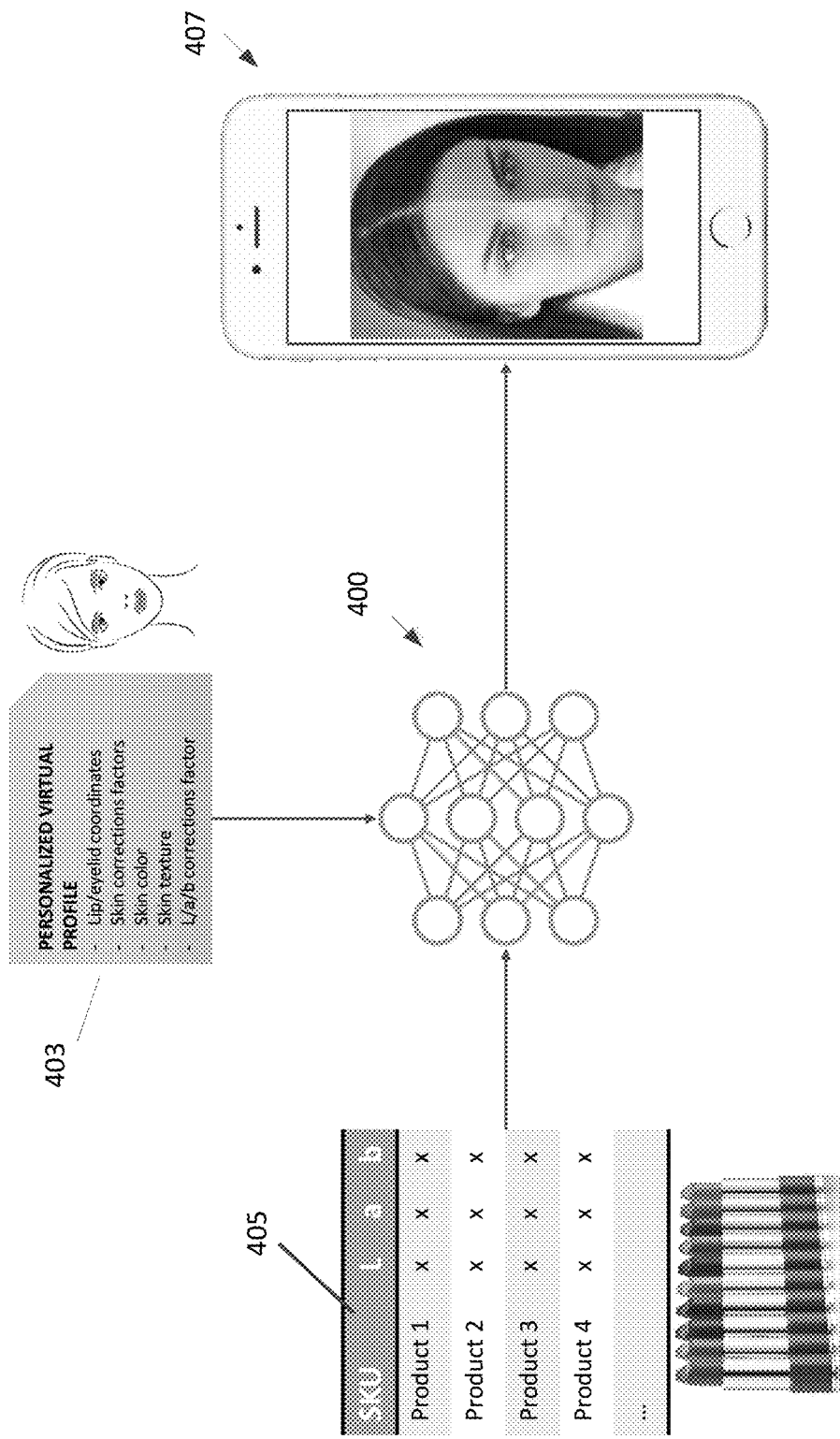
FIG. 4 is a flow diagram of the personalized virtual make-up try-on method in accordance with an exemplary aspect of the disclosure.

FIG. 4 is a flow diagram of the personalized virtual make-up try-on method in accordance with an exemplary aspect of the disclosure. The transformation color matrix may include color value, deviation on skin tone, discrepancy in transparency, discrepancy in dispersion, and discrepancy in light reflection value. These discrepancies are for a particular calibration make-up. The trained artificial neural network 400 can output a modified digital image for a selected make-up product 405, which together with personal information contained in the personalized virtual profile 403 are used to produce an augmented reality image 407 for a video image or still digital image of a subject user. Pixel values in the modified image may be used to adjust the color in an augmented reality image by replacing the color value of the pixel in the image with the modified color value. The modified color values take into account skin color and texture result in a more realistic appearance than the conventional approach of overlaying a make-up color on a face image.

The augmented reality image may be displayed as a split view of lips in the virtual make-up App to show two different proposals at the same time. The App may simulate the lipstick color in different lighting conditions. The App may simulate inter shades lighter or darker to help the consumer to pick the one they like. The App may show different proposals to the consumer to help guide to the right decision.

Figure 5:
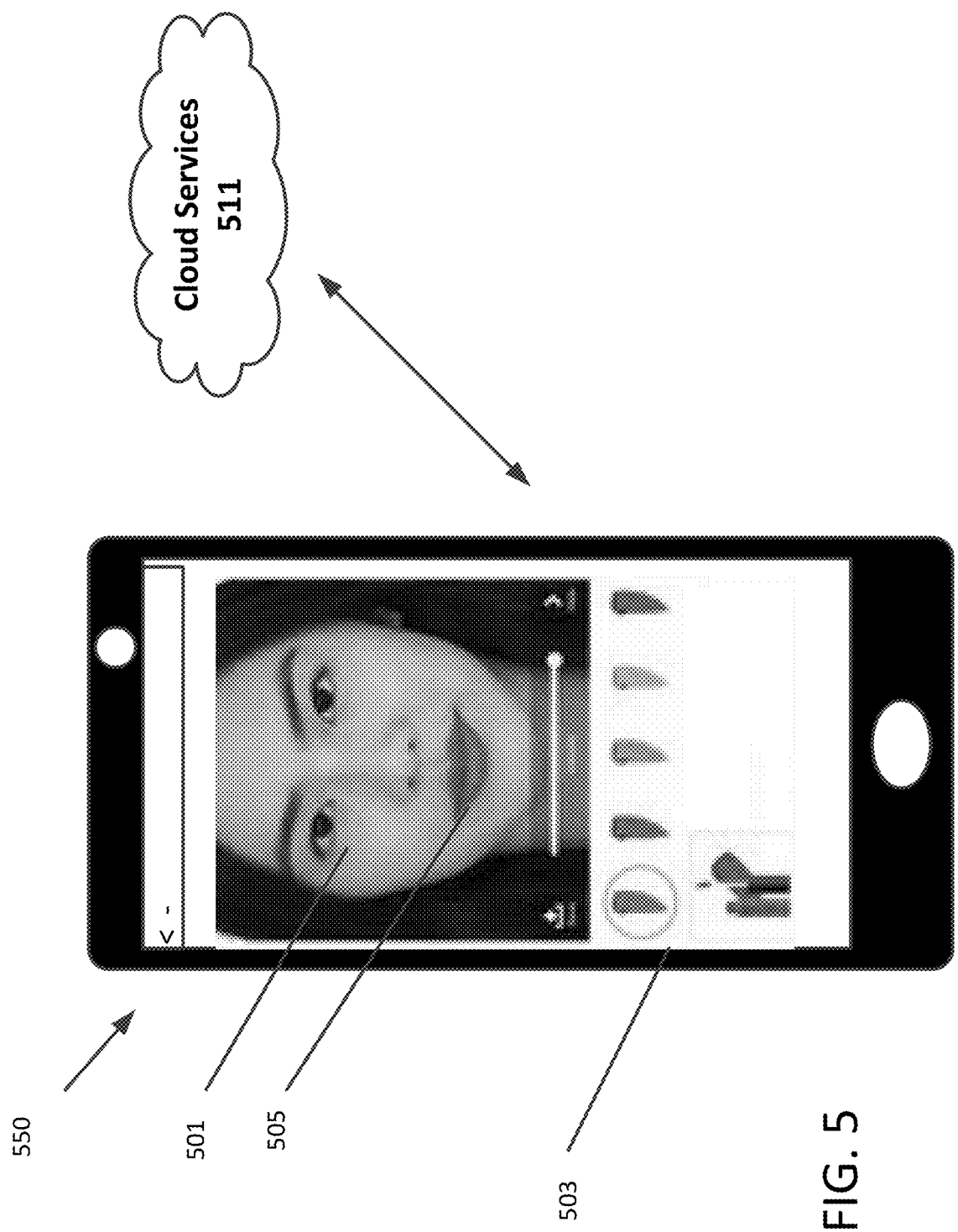
FIG. 5 illustrates a display for a mobile application in accordance with an exemplary aspect of the disclosure.

FIG. 5 illustrates a display for a mobile application in accordance with an exemplary aspect of the disclosure. The display 550 includes a video image or a still digital image of a subject user preferably showing the user's entire face 501. The subject user may select a make-up 503 from a selectable pallet, and the App may create an augmented reality image of the user's face with the virtual make-up applied 505.

Figure 6:
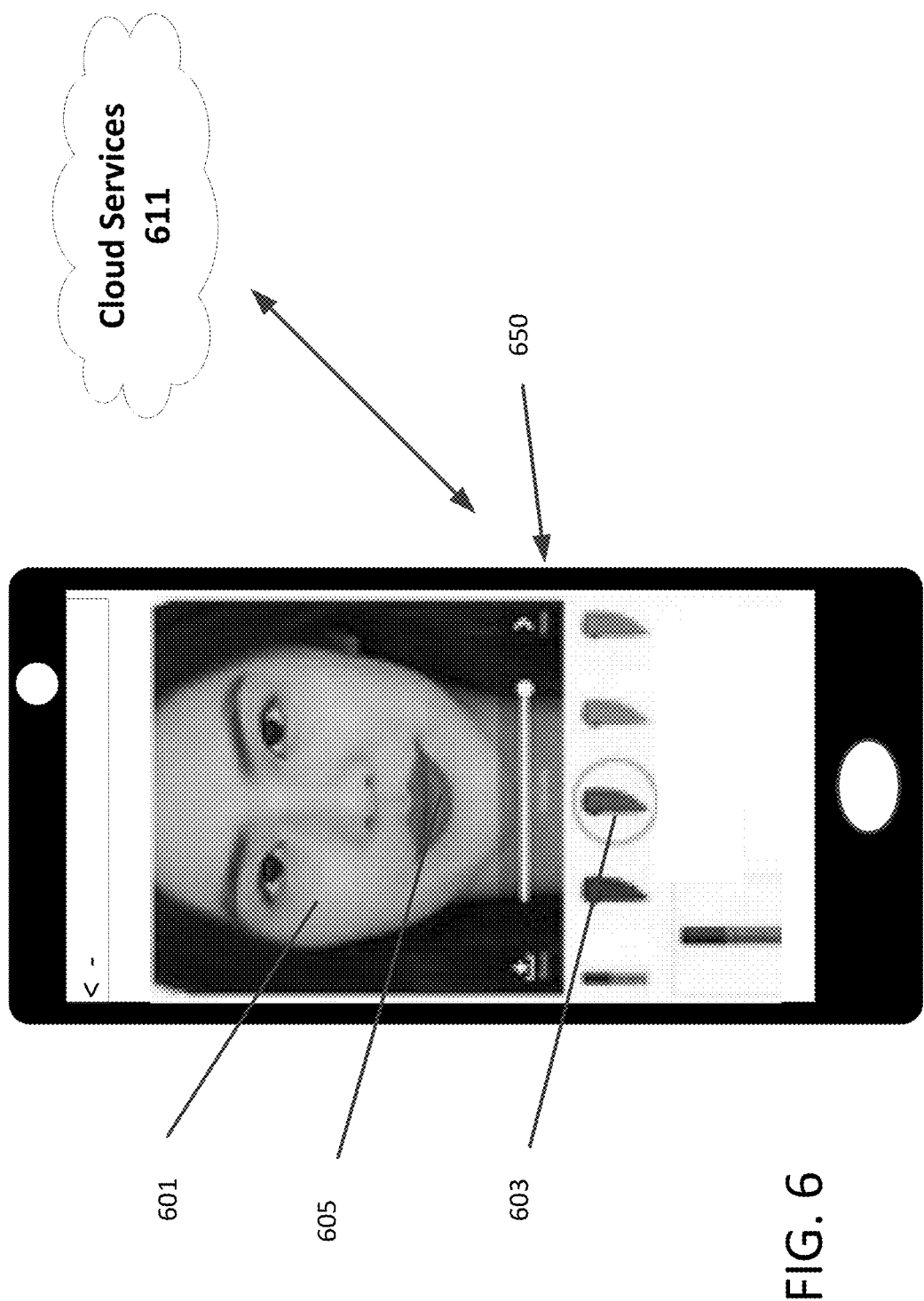
FIG. 6 illustrates a display for a mobile application in accordance with an exemplary aspect of the disclosure.

FIG. 6 illustrates a display for a mobile application in accordance with an exemplary aspect of the disclosure. The display 650 includes a video image or a still digital image of a subject user preferably showing the user's entire face 601. The subject user may select a different make-up 603 from a selectable pallet, and the App may create an augmented reality image of the user's face with the virtual make-up applied 605.

The above disclosure also encompasses the embodiments listed below.

(1) A method, including determining, by processing circuitry, virtual try-on display adjustment information responsive to receiving one or more digital images taken upon application of a calibration cosmetics product, generating, by the processing circuitry, virtual try-on display parameters for modifying a digital try-on experience based at least in part on the virtual try-on display adjustment information, and generating, by the processing circuitry, one or more instances of a modified virtual try-on experience on a user interface based on the virtual try-on display parameters.

(2) The method of feature (1), further including applying a lipstick to a lip, wherein the lipstick characterizes a color and a transparency as the calibration cosmetic product, capturing, by the processing circuitry, the one or more digital images of a user's face having the lipstick applied.

(3) The method of feature (1) or (2), further including applying an eyeshadow to an eyebrow, wherein the eyeshadow characterizes a color and a transparency as the calibration cosmetic product, capturing, by the processing circuitry, the one or more digital images of a user's face having the eyeshadow applied.

(4) The method of any of features (1) to (3), further including applying a lipstick using an applicator that applies a controlled thickness of the lipstick on a lip.

(5) The method of any of features (1) to (4), further including capturing a video of a user's face, using a front facing camera of a mobile device, to obtain the one or more digital images.

(6) The method of any of features (1) to (5), in which the determining virtual try-on display adjustment information includes determining a transformation matrix, the transformation matrix includes correction information for skin color and skin texture.

(7) The method of any of features (1) to (6), further including assessing ambient lighting, using an artificial neural network, for correction of color of the one or more digital images.

(8) The method of any of features (1) to (7), in which the determining virtual try-on display adjustment information includes measuring, by the processing circuitry, color and texture of each pixel in the one or more digital images having the calibration cosmetics product applied, comparing, by the processing circuitry, the measured color values and texture values of each pixel in the one or more digital images to color and texture reference values to determine a deviation of color and texture, and computing, by the processing circuitry, a transformation matrix using the deviation in color and texture.

(9) The method of feature (6), in which the generating one or more instances of a modified virtual try-on experience includes selecting, by the processing circuitry, a virtual cosmetic product, generating, by the processing circuitry, color correction values to be used to adjust color of the selected virtual cosmetic product, and producing, by the processing circuitry, an augmented reality image for a captured digital image using the correction information for color and texture contained in the transformation matrix and the color correction values.

(10) The method of feature (9), n which the processing circuitry uses the color correction values to adjust the color of the selected virtual cosmetic product by replacing pixel values of the one or more images with the respective corrected color values.

(11) A display system, including processing circuitry configured to determine virtual try-on display adjustment information responsive to receiving one or more digital images taken upon application of a calibration cosmetics product, generate virtual try-on display parameters for modifying a digital try-on experience based at least in part on the virtual try-on display adjustment information, and generate one or more instances of a modified virtual try-on experience on a user interface based on the virtual try-on display parameters.

(12) The display system of feature (11), further including a camera, upon applying a lipstick to a lip, wherein the lipstick characterizes a color and a transparency as the calibration cosmetic product, the camera captures the one or more digital images of a user's face having the lipstick applied.

(13) The display system of features (11) or (12), further including a camera, upon applying an eyeshadow to an eyebrow, wherein the eyeshadow characterizes a color and a transparency as the calibration cosmetic product, the camera captures the one or more digital images of a user's face having the eyeshadow applied.

(14) The display system of feature (12), in which the lipstick is applied using an applicator that applies a controlled thickness of the lipstick on a lip.

(15) The display system of any of features (11) to (14), further including a front facing camera, the front facing camera captures a video of a user's face to obtain the one or more digital images.

(16) The display system of any of features (11) to (15), in which the processing circuitry determines virtual try-on display adjustment information including determining a transformation matrix, and the transformation matrix includes correction information for skin color and skin texture.

(17) The display system of any of features (11) to (16), further including an artificial neural network for assessing ambient lighting for correction of color of the one or more digital images.

(18) The display system of any of features (11) to (17), in which the processing circuitry determines virtual try-on display adjustment information including being configured to measure color and texture of each pixel in the one or more digital images having the calibration cosmetics product applied, compare the measured color values and texture values of each pixel in the one or more digital images to color and texture reference values to determine a deviation of color and texture, and compute a transformation matrix using the deviation in color and texture.

(19) The display system of feature (16), in which the processing circuitry generates one or more instances of a modified virtual try-on experience including being configured to select a virtual cosmetic product, generate color correction values to be used to adjust the color of the selected virtual cosmetic product, and produce an augmented reality image for a captured digital image using the correction information for color and texture contained in the transformation matrix and the color correction values.

(20) The display system of feature (19), in which the processing circuitry is configured to use the color correction values to adjust the color of the selected virtual cosmetic product by replacing pixel values of the one or more digital images with the respective corrected color values.

Numerous modifications and variations of the present invention are possible in light of the above teachings. For example, data gathered from various consumers' skin tones and texture will allow scaling of the artificial neural network to more than a single consumer.

The artificial neural network will be able to predict for each product shade the rendering of new cosmetic formula. It is therefore to be understood that within the scope of the appended claims, the invention may be practiced otherwise than as specifically described herein.

The invention claimed is:

1. A method that uses a make-up calibration kit that contains a physical calibration cosmetics product that fully characterizes cosmetic product color, deviation, transparency, light effect, and contains a precise applicator that ensures application of a controlled thickness of the calibration cosmetics product, comprising:
   determining, by processing circuitry, virtual try-on display adjustment information responsive to receiving one or more digital images taken upon application of the physical calibration cosmetics product to a user's face using the precise applicator in order to bring out skin color and skin texture of the user's face based on the product color, deviation, transparency, and light effect;
   generating, by the processing circuitry, virtual try-on display parameters for modifying a digital try-on experience based at least in part on the virtual try-on display adjustment information; and
   generating, by the processing circuitry, one or more instances of a modified virtual try-on experience on a user interface based on the virtual try-on display parameters.

2. The method of claim 1, further comprising:
   applying a lipstick to a lip, wherein the lipstick characterizes a color and a transparency as the calibration cosmetic product; and
   capturing, by the processing circuitry, the one or more digital images of a user's face having the lipstick applied.

3. The method of claim 1, further comprising:
   applying an eyeshadow to an eyebrow, wherein the eyeshadow characterizes a color and a transparency as the calibration cosmetic product; and
   capturing, by the processing circuitry, the one or more digital images of a user's face having the eyeshadow applied.

4. The method of claim 1, further comprising:
   applying a lipstick using an applicator that applies a controlled thickness of the lipstick on a lip.

5. The method of claim 1, further comprising:
   capturing a video of a user's face, using a front facing camera of a mobile device, to obtain the one or more digital images.

6. The method of claim 1, wherein the determining virtual try-on display adjustment information includes determining a transformation matrix, and
   wherein the transformation matrix includes correction information for skin color and skin texture.

7. The method of claim 6, wherein the generating one or more instances of a modified virtual try-on experience includes
   selecting, by the processing circuitry, a virtual cosmetic product;
   generating, by the processing circuitry, color correction values to be used to adjust color of the selected virtual cosmetic product; and
   producing, by the processing circuitry, an augmented reality image for a captured digital image using the correction information for color and texture contained in the transformation matrix and the color correction values.

8. The method of claim 7, wherein the processing circuitry uses the color correction values to adjust the color of the selected virtual cosmetic product by replacing pixel values of the one or more images with the respective corrected color values.

9. The method of claim 1, further comprising:
   assessing ambient lighting, using an artificial neural network, for correction of color of the one or more digital images.

10. The method of claim 1, wherein the determining virtual try-on display adjustment information includes
    measuring, by the processing circuitry, color and texture values of each pixel in the one or more digital images having the calibration cosmetics product applied;
    comparing, by the processing circuitry, the measured color values and texture values of each pixel in the one or more digital images to color and texture reference values to determine a deviation of color and texture; and
    computing, by the processing circuitry, a transformation matrix using the deviation in color and texture.

11. A display system that uses a make-up calibration kit that contains a physical make-up calibration product that fully characterizes cosmetic product color, deviation, transparency, light effect, and contains a precise applicator that ensures application of a controlled thickness of the make-up calibration product, the display system comprising:
    processing circuitry configured to
    determine virtual try-on display adjustment information responsive to receiving one or more digital images taken upon application of the calibration cosmetics product to a user's face using the precise applicator in order to bring out skin color and skin texture of the user's face based on the product color, deviation, transparency, and light effect;
    generate virtual try-on display parameters for modifying a digital try-on experience based at least in part on the virtual try-on display adjustment information; and
    generate one or more instances of a modified virtual try-on experience on a user interface based on the virtual try-on display parameters.

12. The display system of claim of claim 11, further comprising:
    a camera,
    upon applying a lipstick to a lip, wherein the lipstick characterizes a color and a transparency as the calibration cosmetic product,
    the camera captures the one or more digital images of a user's face having the lipstick applied.

13. The display system of claim 11, further comprising:
    a camera,
    upon applying an eyeshadow to an eyebrow, wherein the eyeshadow characterizes a color and a transparency as the calibration cosmetic product,
    the camera captures the one or more digital images of a user's face having the eyeshadow applied.

14. The display system of claim 12, wherein
    the lipstick is applied using an applicator that applies a controlled thickness of the lipstick on a lip.

15. The display system of claim 11, further comprising:
    a front facing camera, wherein the front facing camera captures a video of a user's face to obtain the one or more digital images.

16. The display system of claim 11, wherein the processing circuitry determines virtual try-on display adjustment information including determining a transformation matrix, and wherein the transformation matrix includes correction information for skin color and skin texture.

17. The display system of claim 16, wherein the processing circuitry generates one or more instances of a modified virtual try-on experience including being configured to
select a virtual cosmetic product,
generate color correction values to be used to adjust the color of the selected virtual cosmetic product, and
produce an augmented reality image for a captured digital image using the correction information for color and texture contained in the transformation matrix and the color correction values.

18. The display system of claim 17, wherein the processing circuitry is configured to use the color correction values to adjust the color of the selected virtual cosmetic product by replacing pixel values of the one or more digital images with the respective corrected color values.

19. The display system of claim 11, further comprising:
an artificial neural network for assessing ambient lighting for correction of color of the one or more digital images.

20. The display system of claim 11, wherein the processing circuitry determines virtual try-on display adjustment information including being configured to
measure color and texture values of each pixel in the one or more digital images having the calibration cosmetics product applied,
compare the measured color values and texture values of each pixel in the one or more digital images to color and texture reference values to determine a deviation of color and texture, and
compute a transformation matrix using the deviation in color and texture.

* * * * *